United States Patent [19]
Kanitz et al.

[11] Patent Number: 5,727,372
[45] Date of Patent: Mar. 17, 1998

[54] ON-BOARD CHARGING SYSTEM FOR ELECTRIC LAWN MOWER

[75] Inventors: Allan Dale Kanitz, Prior Lake; Jay Jeffrey Kakuk, Plymouth, both of Minn.

[73] Assignee: The Toro Company, Minneapolis, Minn.

[21] Appl. No.: 655,732

[22] Filed: May 30, 1996

[51] Int. Cl.⁶ .................................................. A01B 34/82
[52] U.S. Cl. .................................................. 56/11.9; 56/7
[58] Field of Search ....................... 56/6, 7, 10.2 A, 56/10.2 R, 11.9, 11.1, 10.5, 17.5, DIG. 15; 320/2; 364/424, 425, 426, 429

[56] References Cited

U.S. PATENT DOCUMENTS

| | | | |
|---|---|---|---|
| D. 347,640 | 6/1994 | Chunn et al. | D15/14 |
| 3,696,593 | 10/1972 | Thorud et al. | 56/17.5 |
| 4,146,825 | 3/1979 | Harhay | 320/23 |
| 4,987,729 | 1/1991 | Paytas | 56/11.9 |
| 5,166,595 | 11/1992 | Leverich | 320/32 |
| 5,203,147 | 4/1993 | Long | 56/10.1 |
| 5,248,928 | 9/1993 | Gilmore | 320/37 |
| 5,261,215 | 11/1993 | Hartz et al. | 56/11.9 |
| 5,299,414 | 4/1994 | Long | 56/17.4 |
| 5,301,494 | 4/1994 | Peot et al. | 56/10.5 |
| 5,323,593 | 6/1994 | Clin et al. | 56/11.9 X |
| 5,325,041 | 6/1994 | Briggs | 320/44 |
| 5,406,778 | 4/1995 | Lamb et al. | 56/7 |
| 5,410,866 | 5/1995 | Long | 56/17.4 |
| 5,442,901 | 8/1995 | Niemela et al. | 56/11.9 |
| 5,444,965 | 8/1995 | Colens | 56/11.9 X |
| 5,490,370 | 2/1996 | McNair et al. | 56/11.9 |
| 5,502,957 | 4/1996 | Robertson | 56/11.9 |
| 5,540,037 | 7/1996 | Lamb et al. | 56/7 |

OTHER PUBLICATIONS

Ryobi, Model BMM2400 Cordless Mulching Mower, Owner's Operating Manual, Jan. 1994.

The Toro Company, 16" Carefree Electric™, Parts Catalog, 1977.

The Toro Company, 16" Carefree Electric™, Owner's Manual, 1975.

Black & Decker, CMM650 18" Cordless Mulching Mower, Instruction Manual, Dec. 1993.

*Primary Examiner*—Terry Lee Melius
*Assistant Examiner*—Robert Pezzuto
*Attorney, Agent, or Firm*—Merchant, Gould, Smith, Edell, Welter & Schmidt

[57] ABSTRACT

A self-contained apparatus for charging a battery on an electrically powered turf maintenance vehicle. The charger includes an AC to DC converter for accepting a source of AC power and providing a DC voltage, a sensor for measuring the voltage level of the battery, and a controller for determining the voltage of the battery and for changing the charge rate of the battery. The apparatus also includes visual indicators for warning an operator of normal and abnormal charge conditions of the battery, as well as the remaining charge of the battery. Further, the controller uses a plurality of timers for determining the length of charge times and comparing the values of the timers with count values, wherein if the values exceed the count values, then a visual indicator is lit and charging is terminated. The apparatus is mounted in a box-type shell on-board the turf maintenance vehicle.

19 Claims, 8 Drawing Sheets

Output LED's (61) Summary

| Mode | Charge Action State | LED1 | LED2 | LED3 |
|---|---|---|---|---|
| DSEL=0 (Mode 1) | Battery absent or over-voltage fault | Low | Low | High |
| | Pre-charge qualification | Flash | Low | Low |
| | Fast charging | High | Low | Low |
| | Maintenance charging | Low | High | Low |
| | Charge pending (temperature out of range) | X | X | High |
| | Charge fault | X | X | High |

Notes: X = LED state when fault occurred; Flash = 1/6 sec. low, 1/6 sec. high
The controller block 60 annunciates maintenance when charging current is off and fast charge whenever charging current is on.

FIG. 7

ON-BOARD CHARGING SYSTEM FOR ELECTRIC LAWN MOWER

FIELD OF THE INVENTION

This invention generally relates to a turf maintenance apparatus, and more particularly relates to an on-board battery charger for an electric turf maintenance vehicle or lawnmower.

BACKGROUND OF THE INVENTION

Several U.S. Patents disclose turf maintenance vehicles (e.g., lawn mowers and greens mowers) which include a battery powered electric motor for driving a cutting blade. Examples of such patents include: U.S. Pat. No. 4,987,729 issued to Paytas; U.S. Pat. No. 5,203,147 issued to Long; and U.S. Pat. No. 5,406,778 issued to Lamb et al. Each of the foregoing patents, however, suffers a significant drawback in that the battery charger is not located on-board the mower.

One reason that battery charger devices have not been included on-board the mower is that the standard AC power supply (e.g., from an outlet) must be connected directly to the mower. It will be appreciated by those skilled in the art that in the United States, a 120 volt alternating current supply at 60 Hz supply is standard, with other countries using other standards. Once the supply is connected to the mower, then a voltage transformer and regulator device must be included on the mower. However, such components in the past have been bulky and sensitive. Further, connection of a higher voltage to the mower necessitated additional design considerations which are not required for the more common internal combustion mowers. For example, insulating and potting of the electrical components is required in order to seal the components from moisture, dirt and other contaminants (e.g., such as fertilizers, etc.) commonly found in a turf maintenance environment.

In general, battery charger systems are also known in the art. Several U.S. Patents describing such systems include: U.S. Pat. No. 5,166,595 issued to Leverich; U.S. Pat. No. 5,248,928 issued to Gilmore; and U.S. Pat. No. 5,325,041 issued to Briggs. While such systems are known, they do not address the concerns of an on-board system for a turf maintenance vehicle as described in the previous paragraphs.

Further, adding to the problems found in the prior art is the additional desire for the preferred electric mower to include a mulching feature. Those skilled in the art will appreciate that mulching lawn mowers are known which direct the grass clippings severed by the cutting blade downwardly out of the cutting chamber in order to deposit such clippings in the standing grass remaining in the path of cut grass. Various kinds of such mulching mowers are known. For example, mulching mowers are disclosed in U.S. Pat. No. 4,205,512 issued to Thorud and U.S. Pat. No. 4,951,449 issued to Thorud, both of which are assigned to the assignee of this invention.

Many of these mulching mowers are powered by internal combustion engines—in which power consumption is not generally an issue. More specifically, it will be appreciated that when internal combustion engines are utilized, engines of sufficient horsepower are generally available and allow the grass clippings to be mulched without bogging down. However, mowers powered by electric motors have certain advantages, including those of reduced emissions.

In the field of electrically powered mowers as noted above, various mowers have been introduced having DC motors powered by self-contained, rechargeable batteries. The power drain on such electrically powered mowers when they are used to mulch is significant. As a practical matter, the batteries may become discharged before the entire lawn or other turf area is mowed. This requires that the batteries be recharged before the mowing job can be finished, which is obviously inconvenient. Thus, the power consumption of such mowers during mulching, the methodology utilized to recharge the batteries, and the time period required to charge and properly condition the batteries are important design factors.

Accordingly, there is a need in the art to develop a method and apparatus for recharging the batteries of a turf maintenance vehicle quickly and to a maximum level in order to increase the run time per charge. Further, in order to reduce the number of parts required to charge the batteries, an on-board charger is desirable which is insulated and sealed, as well as complying with certifying agency rules and other regulations.

SUMMARY OF THE INVENTION

The present invention provides a reliable method and apparatus for automatically charging and subsequently monitoring the charge of one or more batteries (hereafter referred to for convenience as "battery") for an electric turf maintenance vehicle (hereafter referred to for convenience as electric mower). The charger device utilizes a methodology for minimizing thermal energy, is sealed to minimize contamination by moisture, etc., and includes insulation against high potential to ground discharges, whereby safety regulatory body rules are complied with.

In a preferred embodiment constructed according to the principles of the present invention, the charger device includes an integrated chip/controller to control the battery charging operation in accordance with the principles of a constant current pulse mode device. This charging technique is used in order to restore charge relatively quickly without adversely affecting battery life by constant monitoring of battery voltage during charging and standby modes. The constant current charging works to eliminate any charge imbalance in the battery and is especially effective when several batteries are charged in series as in 24 volt and 36 volt applications.

The present invention accommodates a range of battery systems (amp-hour capacities and voltages) through selection of different electrical components on the same circuit board. Also included are battery discharge indicators and output LED's indicating the status of operation of the charger device.

Other features of the present invention include the preferred embodiment being a self-contained apparatus which includes an AC to DC converter for accepting a source of AC power and providing a DC voltage, a sensor for measuring the voltage level of the battery, and a controller for determining the voltage of the battery and for changing the charge rate of the battery. As noted above, the apparatus includes visual indicators for warning an operator of normal and abnormal charge conditions of the battery. The controller uses a plurality of timers for determining the length of charge times and comparing the values of the timers with count values, wherein if the values exceed the count values, then a visual indicator is lit and charging is terminated. The apparatus is mounted in one or more box-type shells on-board the turf maintenance vehicle.

Therefore, according to one aspect of the invention, there is provided a self-contained battery charger apparatus for charging a battery for an electrically powered turf mower, comprising: an AC to DC converter for accepting a source of AC power and providing a D.C. current source output; a regulator device operatively connected between said converter for receiving said current source output and the battery, wherein said regulator device is responsive to control signals for selectively providing said current source output to the battery; first sensor means for measuring the voltage of the battery and providing a first voltage signal; second sensor means for measuring the current delivered to the battery and providing a second voltage signal; controller means, operatively connected to said first and second sensor means and said regulator device, for determining the voltage of the battery from said first voltage signal, for determining the current provided to the battery from said second voltage signal, and for providing a pulse width modulated control signal to said regulator device to provide a periodic constant current level to the battery based on said determined battery voltage and current.

According to another aspect of the invention, there is provided an on-board battery charger apparatus, of the type used to charge a battery for an electrically powered turf mower, comprising: an electric turf mower, said turf mower including: a frame; a battery; and a cutting member, rotatably connected to said frame and arranged and configured for cutting turf; an electric motor, operatively connected to said frame, said battery, and said cutting member, for rotating said cutting member; a single box-type shell cooperatively mounted to said turf mower; an AC to DC converter for accepting a source of AC power and providing a D.C. current source output; a regulator device operatively connected between said converter for receiving said current source output and the battery, wherein said regulator device is responsive to control signals for selectively providing said current source output to the battery; first sensor means for measuring the voltage of the battery and providing a first voltage signal; second sensor means for measuring the current delivered to the battery and providing a second voltage signal; controller means, operatively connected to said first and second sensor means and said regulator device, for determining the voltage of the battery from said first voltage signal, for determining the current provided to the battery from said second voltage signal, and for providing a pulse width modulated control signal to said regulator device to provide a periodic constant current level to the battery based on said determined battery voltage and current; and wherein said controller means, said first and second sensor means, and said regulator means are located and potted entirely within said shell, whereby the turf mower is U.L. listed.

These and various other advantages and features which characterize the invention are pointed out with particularity in the claims annexed hereto and forming a part hereof. However, for a better understanding of the invention, its advantages and objectives obtained by its use, reference should be made to the drawing which forms a further part hereof and to the accompanying descriptive matter, in which there is illustrated and described a preferred embodiment of the invention.

BRIEF DESCRIPTION OF THE DRAWING

Referring to the drawing, wherein like reference numerals represent like parts throughout the several views.

DETAILED DESCRIPTION

The principles of this invention apply to the charging of a battery located on a turf maintenance vehicle, and more particularly on a rotary lawn mower ("electric mower"). This invention provides an on-board charger which senses and provides a varying DC voltage level based on the determined battery voltage. Prior to describing the preferred battery charger, a brief overview of the preferred electric mower on which the present invention is employed will be described.

Figure 1A:
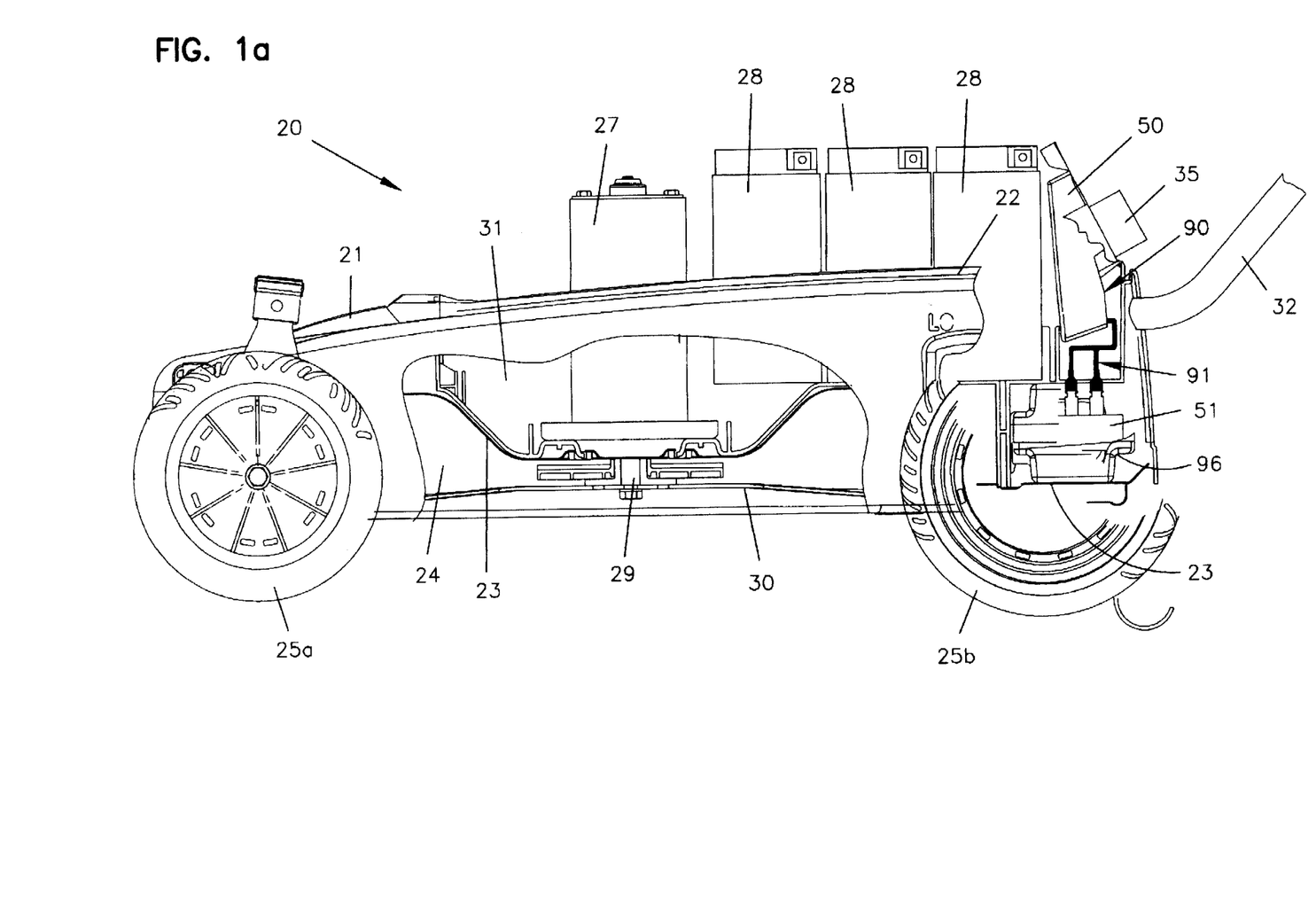
FIG. 1a is a side elevational view of an electric mower 20 in which the present invention may be employed, wherein the electric mower 20 illustrates the physical location of several of the various components of the present invention therein.
Figure 1B:
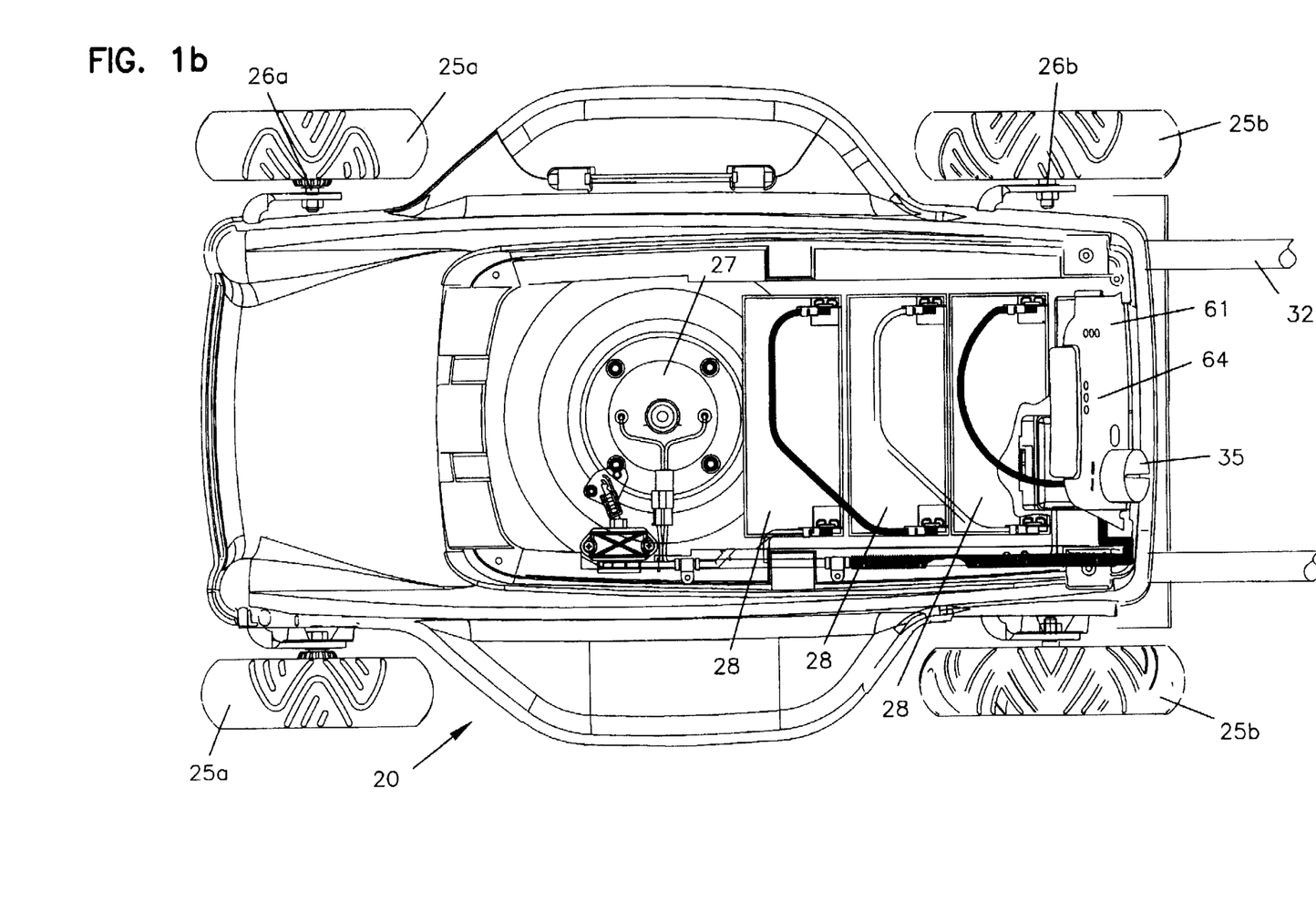
FIG. 1b is a top plan view of the electric mower 20 of FIG. 1a, with portions of the cover of the electric mower 20 removed.
Figure 1C:
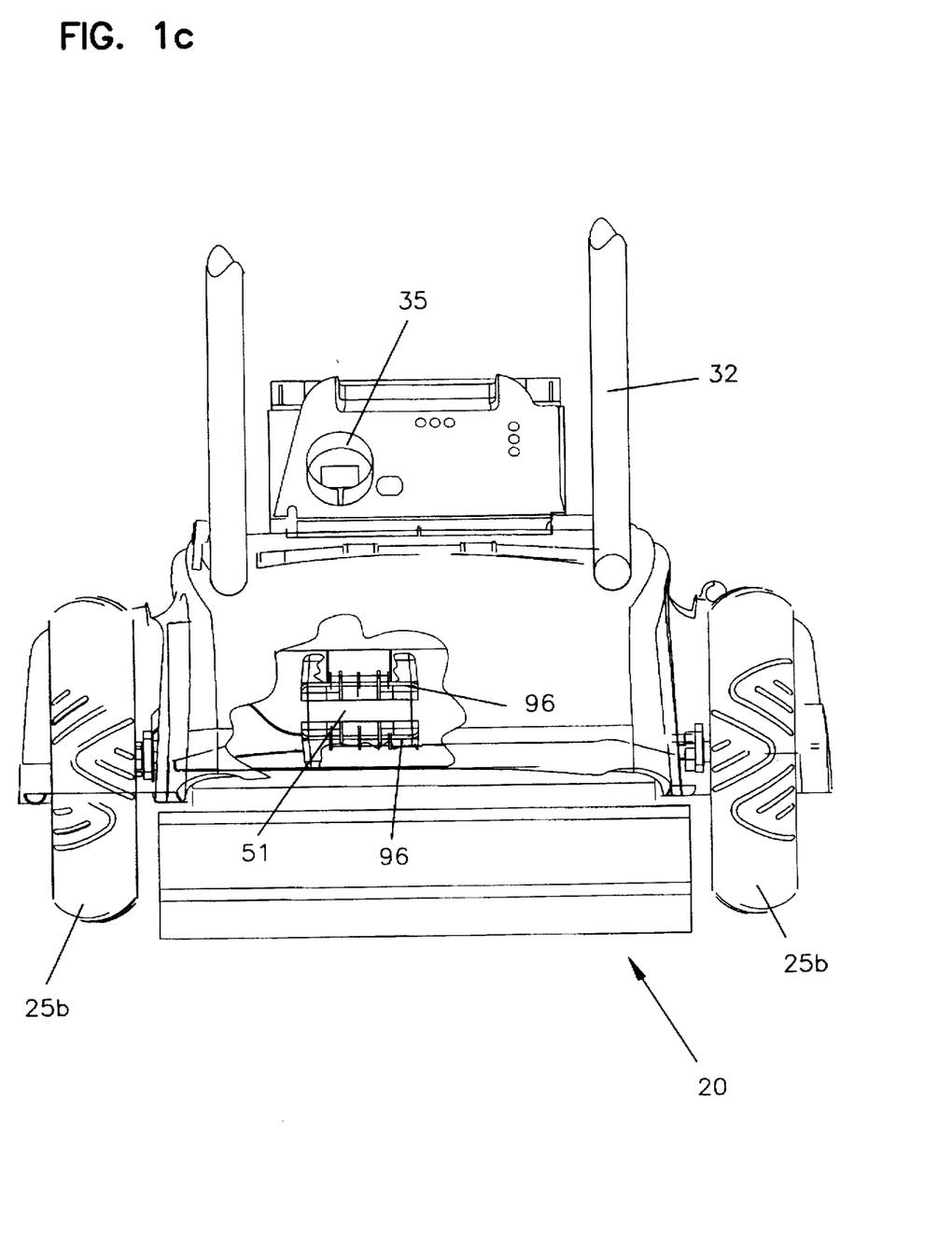
FIG. 1c is a rear elevational view of the electric mower 20 of FIG. 1a, with portions of the electric mower 20 broken away.

Referring first to FIGS. 1a, 1b, and 1c, the electric mower 20 of this invention includes a mower housing 21 having a two piece sandwich construction for providing a cost-effective yet strong and durable electric mower 20. The first part of the sandwich construction includes a one-piece plastic deck 22 which is injection molded from an inexpensive, lightweight plastic material (e.g. high-density polyethylene). The deck 22 forms the visible superstructure of electric mower 20. The second part of the sandwich construction includes a metallic liner 23, stamped from relatively thin steel (e.g. 20 gauge), that forms the cutting chamber 24 and is integrally affixed to plastic mower deck 22 to be received within plastic mower deck 22.

Deck 22 and liner 23 are integrally affixed to one another by a plurality of attachment screws (not shown).

Mower housing 21 is supported for movement over the ground by a plurality of rotatable, ground engaging wheels 25, disposed in a pair of front wheels and a pair of rear wheels. Only one front wheel 25a and one rear wheel 25b of each pair are shown in FIG. 1a while all four wheels are shown in FIG. 1b. The front wheels 25 are rotatably carried on the opposed ends of a front axle 26a, while the rear wheels 25 are rotatably carried on the opposed ends of a rear axle 26b (best shown in FIG. 1b). The front 26a and rear 26b axles are supported on mower housing 21 simply by being captured or trapped between deck 22 and liner 23 when those two components are assembled together to form mower housing 21.

A motive means 27 is in the preferred embodiment a D.C. electric motor powered by self-contained batteries 28 carried in mower housing 21. The motive means 27 is arranged with its drive shaft 29 extending vertically for rotating a cutting blade 30 within cutting chamber 24 in mower housing 21. Cutting chamber 24 is configured to act as an extremely effective mulcher even with a relatively low power motive means 27.

Motive means 27 is carried on mower housing 21 within a recessed motor compartment 31 provided in plastic deck 22. Deck 22 preferably includes a motor shroud (not shown) to enclose motor compartment 31 to protect motive means 27 and its associated electrical components from exposure to the ambient environment during operation.

Figure 2:
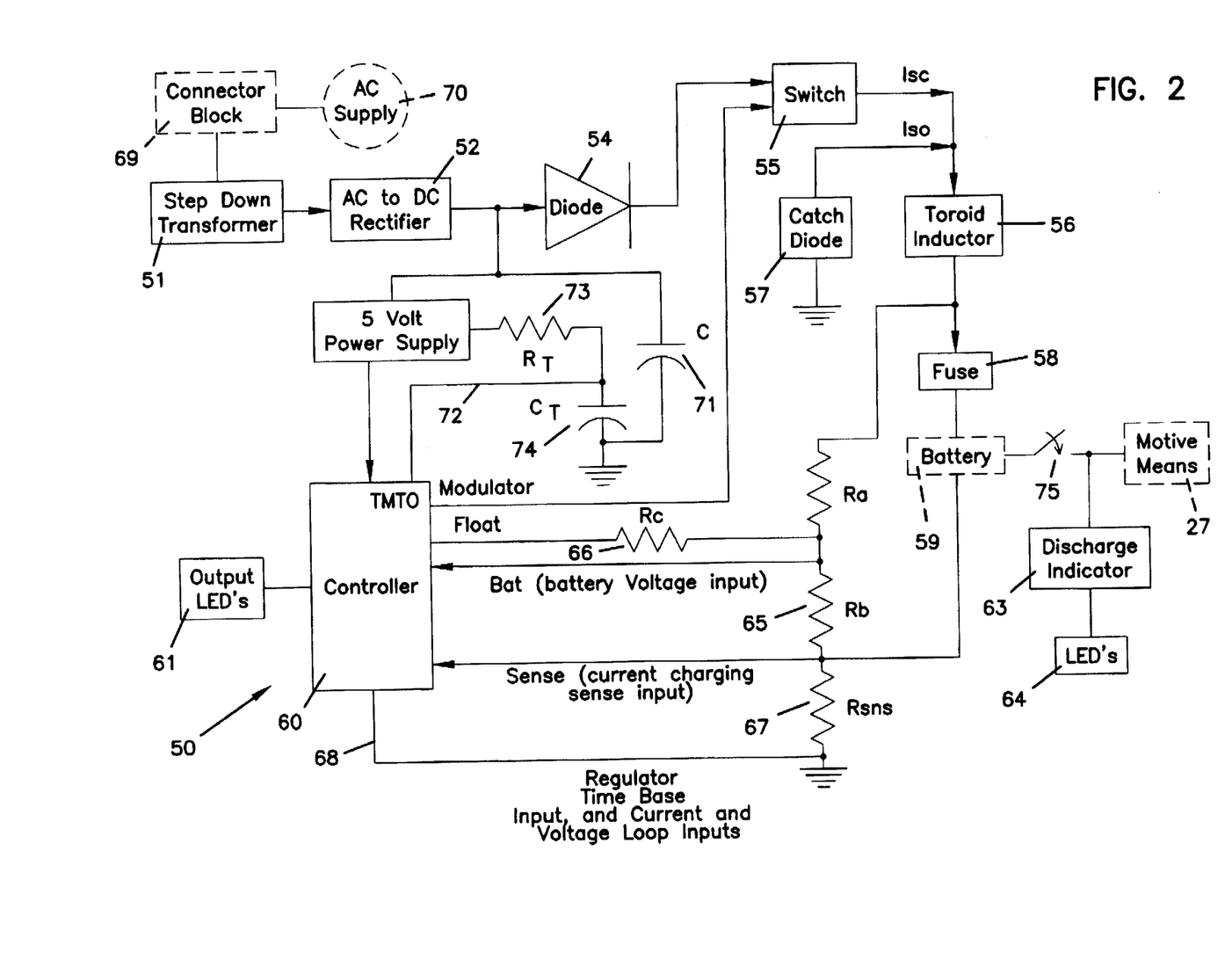
FIG. 2 is a block diagram illustrating the various functional blocks which comprise the present invention.

Batteries 28 are also located on-board the electric mower 20. The batteries 28 may be of varying voltages, but in the preferred embodiment are 12 volt sealed, deep-cycle, lead acid batteries of the type manufactured by Yuasa. The batteries 28 are preferably connected in series so as to provide a 24 or 36 volt supply. In FIG. 2 (discussed below), the batteries 28 are shown collectively as a single functional block designated by the number 59.

In addition, electric mower 20 includes a U-shaped handle assembly 32 extending upwardly and rearwardly from mower housing 21 to allow electric mower 20 to be pushed and manipulated by an operator who walks behind mower housing 21. Thus, the preferred electric mower 20 utilized in connection with the present invention is of the type commonly known as a walk behind rotary mower. A more detailed description of the preferred electric mower 20 with which the present invention is utilized is set forth in U.S. patent application Ser. No. 08/494,436, filed on Jun. 26, 1995, titled MULCHING MOWER, and U.S. patent application Ser. No. 08/495,069, filed on Jun. 26, 1995, titled LAWN MOWER HAVING NESTED DECK AND LINER. Each of the foregoing applications are commonly assigned to the assignee of the present invention and such applications are incorporated herein by reference and made a part hereof.

Now referring to FIG. 2, a functional block diagram of a preferred on-board charging system for an electric lawn mower is illustrated. The charger device, including transformer and regulator components, is shown generally at 50. The battery block 59, connector block 69, AC supply 70, motive means 27 and switch 75 are shown in phantom in FIG. 2 since those components are used in connection with charger device 50, but are separate from charger device 50.

First, in FIG. 2, a supply of AC electricity 70 is provided to step-down transformer block 51 via the connector block 69 when recharging is desired. The AC power 70 is preferably obtained from a standard outlet and is 120 volts AC and 60 Hz. It will be appreciated by those of skill in the art that if sources of power are utilized which differ from the U.S. standard, then modifications may be made in the various components of the present invention. A portion of connector block 69 is best seen in FIGS. 1a, 1b, and 1c at 35.

Further, it will be appreciated that while not specifically detailed in FIG. 2, it will be understood that the functional blocks, and other devices are properly connected to appropriate bias and reference supplies so as to operate in their intended manner. The analog controller and other devices are also to be connected to appropriate buffer, capacitor and other components so as to operate properly.

Still referring to FIG. 2, the step transformer block 51 is a step down isolation transformer of the type manufactured by HWA Sung of Seoul, Korea having typical output voltages of 39 and 53 Vac RMS for twenty-four and thirty-six volt battery systems, respectively. It will be appreciated that block 51 provides a stepped down AC voltage to the AC to DC wave rectifier block 52. In the preferred embodiment, AC to DC wave rectifier block 52 is a full wave rectifier of the type manufactured by Diodes Inc. of Chatsworth Calif., model number RS404L. The full wave rectified signal is in turn provided to blocking diode 54 and to switch means block 55. The wave rectified signal is also provided to a 5-volt power supply block 53 which provides a regulated five volt output to the controller means 60.

Capacitor 71 is used to store and source adequate energy to supply the "downstream" pulse width modulated ("PWM"), regulated charge energy to the battery block 59. The capacitor 71 provides the necessary charge energy between the crests of the full wave rectified signal.

Switch means block 55 operates upon receipt of a control signal from the controller means 60 (described below). In the preferred embodiment, the control signal turns on a transistor (not shown), which then turns on a p-channel MOSFET transistor (not shown). The p-channel MOSFET transistor is sized and configured to handle the power from the rectifier block 52 to the toroid inductor block 56.

In the preferred embodiment, controller means 60 includes an integrated circuit chip which is capable of providing a constant-current pulse mode for charging a battery. In the preferred embodiment, a chip manufactured by Benchmarq Microelectronics, Inc. of Dallas, Tex., under model number designation bq2031 is used. As described above, the controller means 60 provides a modulated control signal to switch means block 55, in order to operate the charger device 50 in a pulse mode.

Figure 7:
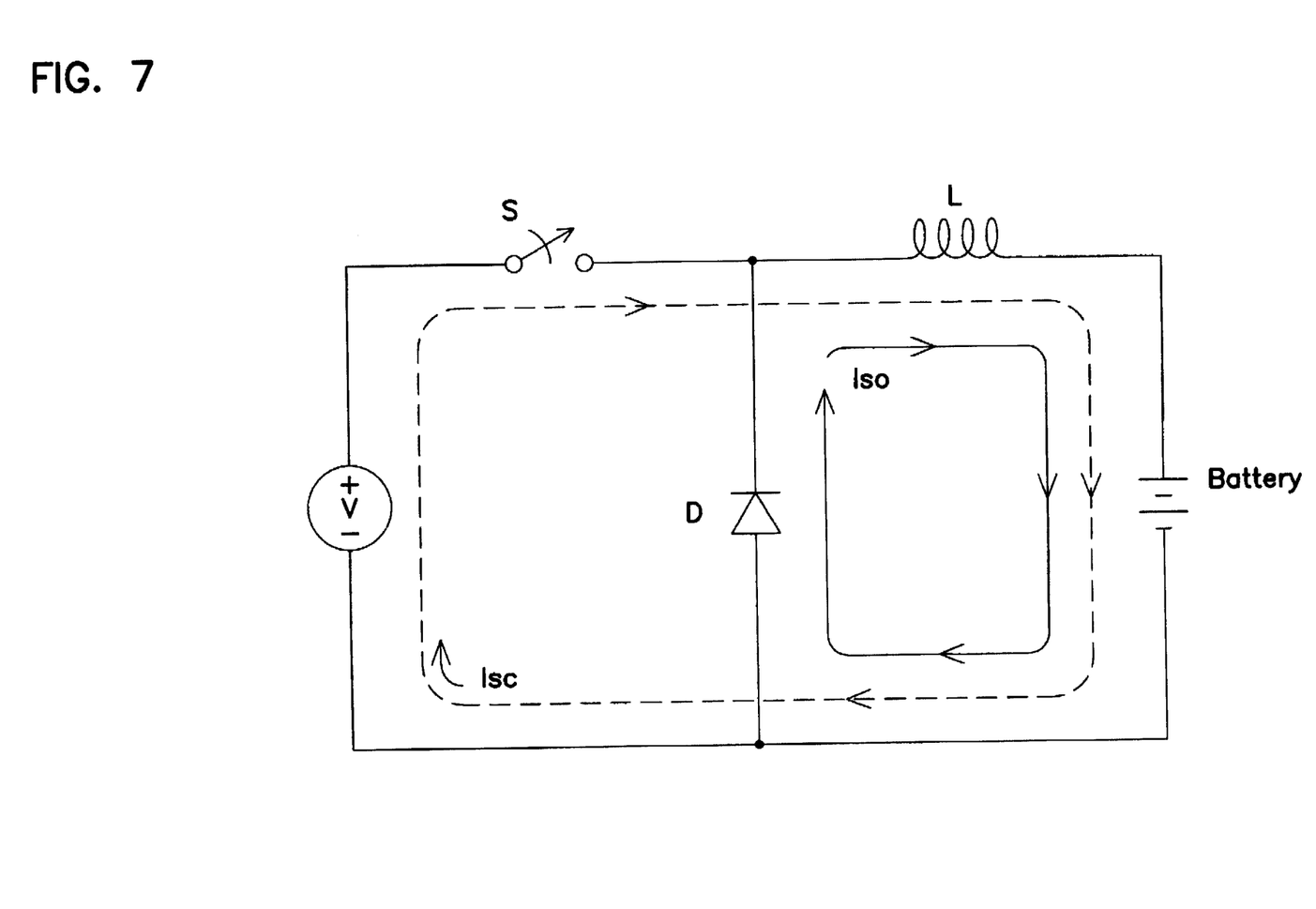
FIG. 7 is a diagrammatic illustration of the principles of a constant current pulse mode battery charger of the present invention.

Next referring to FIG. 7, there is illustrated a simplified diagram of the operating principles of a switching regulated charger, which principles are utilized in connection with the present invention. In operation, when switch S is closed, current flows from the input power source V to the battery. When this occurs, the current flow is designated as $I_{sc}$, the magnetic field of coil L increases, and current is provided to the battery for charging. However, when switch S is opened, then the current flowing through the inductor tries to remain constant (i.e., and the magnetic field of coil L collapses). Therefore, the current flow to the battery continues about the loop designated as $I_{so}$. This current flow occurs through diode D, which blocks the current $I_{sc}$ from flowing through this path when the switch S is closed. When a switching pulse is utilized on the order of 100kHz in conjunction with the coil L exhibiting low losses at high frequencies and flux densities, in addition with a high current, high voltage, power MOSFET and a low loss catch diode, the result is a compact, high efficiency charger device with low thermal loss. The low thermal loss in turn allows the charger device to be enclosed and/or potted without undue thermal stress on the power electronics.

Referring again to FIG. 2, the switched DC voltage is provided to toroid inductor 56 and then through fuse block 58 to battery block 59. Catch diode block 57 operates as the diode through which current $I_{so}$ flows when the switch is open (in the present case, when the MOSFET is not conducting). Accordingly, the cathode end of catch diode 57 is connected to the switch means 55 and the toroid inductor 56. The anode end of catch diode 57 is connected to ground (e.g., effectively the negative terminal of battery 59).

The voltage provided from the toroid inductor 56 to battery block 59 is also provided to a voltage divider network comprised of resistor $R_A$ 64, resistor $R_B$ 65 and resistor $R_C$ 66. The divided voltage level provides the battery voltage input to the controller means 60. The negative polarity of battery 59 is also provided to controller means 60, as are a regulator time base input, and current and voltage loop inputs via line 68. A timeout timebase is provided to controller block 60 via line 72 from the resistor-capacitor network $R_T$ 73 and $C_T$ 74, respectively for getting the maximum charge time. The controller means 60 utilizes a plurality of timers for determining the length of charge times and comparing the values of the timers with count values. If the values exceed the count values, then LED's 61 are lit (discussed below). Further, controller means 60 monitors the temperature of battery block 59 via a thermister (not shown).

Battery block 59 is connected to motive means 27 via switch 75 and also to discharge indicator functional block 63. Block 63 provides a visually perceptible indication to an operator via LEDs 64 of the charge level of battery block 59.

Figure 6:
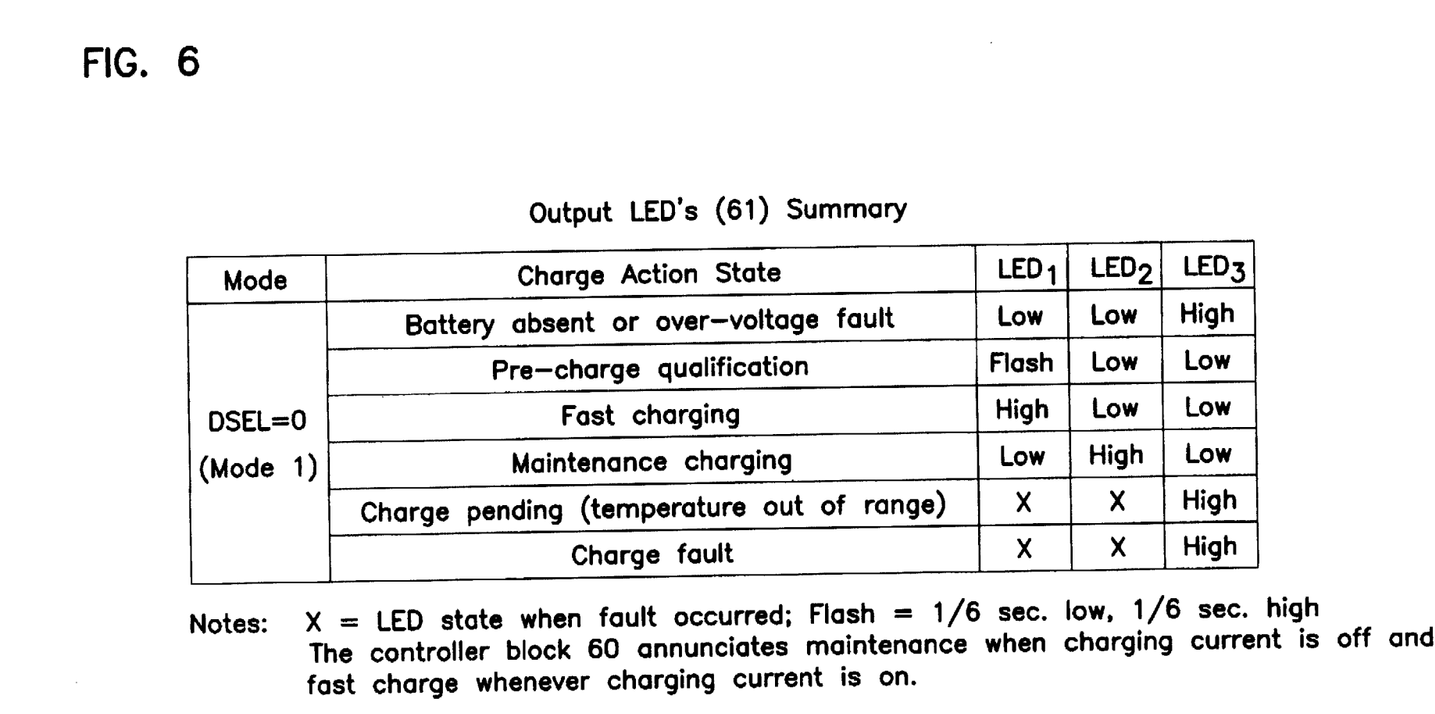
FIG. 6 is a table illustrating the output LED 61 status indicia configurations.

Controller 60 also provides output LED's 61 for determining the present state of the controller chip. The table set forth as FIG. 6 indicates the LED 61 output to determine operation of the charger device 50.

It will be appreciated that while a 24 volt or 36 volt battery block 59 is used in the preferred embodiments, other voltages might also be used. Further, when differing voltage supplies are utilized, the motive means 27, the transformer block 51, and various electrical components (e.g., the toroid inductor 56, voltage divider network, etc.) should be selected accordingly.

Figure 5:
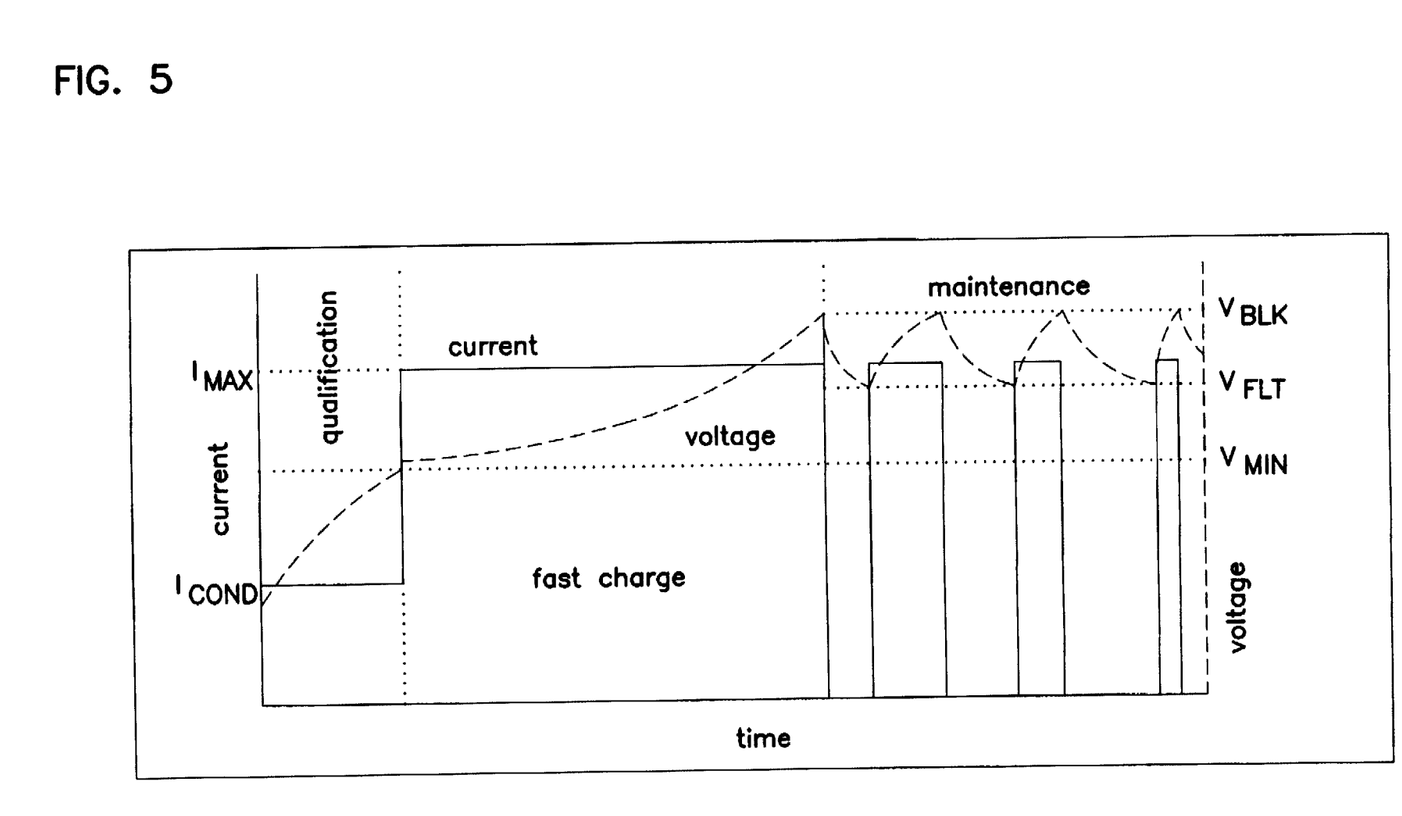
FIG. 5 is a diagrammatic illustration of the preferred embodiment battery charging cycle.

Turning now to FIG. 5, there is illustrated a diagrammatic illustration of the charging operation employed by the controller means 60 of the present invention.

First, during the initial stage of charging, the current provided is at a level $I_{cond}$ which prequalifies the battery for charging. The criteria during the prequalification is that the battery temperature, voltage and condition must be within predetermined ranges prior to bulk/fast charge operation. In the case of a battery that is too warm or too cold, the charge action begins with limits provided to the controller by voltage selectable tolerances. In the event that the temperature is outside of these limits, then the controller means 60 waits until the temperature becomes acceptable. Second, once the temperature is within range, then the controller means 60 checks for the electrical condition of the battery by applying a constant voltage for a predetermined period and measuring the current to insure that the battery is accepting at least a certain level of current. If it is not, then the controller indicates a fault (see FIG. 6 and discussion below). If the battery block 59 does accept the minimum current, then the controller means 60 applies a constant current for a predetermined period of time to and measures the voltage of the battery against a predetermined voltage level. If the voltage is greater than the predetermined voltage, then the second phase of charging begins. Alternatively, if the voltage does not reach the predetermined level, then the charger indicates a fault (see FIG. 5 and discussion below).

Next in operation, the charger device 50 begins the bulk phase of charging. In this phase a constant current is provided to the battery block 59. It will be appreciated by those skilled in the art that the constant current referred to herein is a time averaged value, and that, as discussed above, the controller means 60 actually provides a rapidly switched control signal to the switching means 55. However, because the inductor 56 is utilized, the actual current flow is dependent upon the size of is inductor 56. While the switch means 55 is on, current flows from the input through the switch and the inductor 56, and into the load. The inductor current rises linearly during this period. The change in inductor current, or ripple, is determined by the voltage applied across the inductor 56, its inductance, and the switch-on time. In the present case, the inductor 56 is sized and configured to smooth the current flow to the battery block 59. It will also be appreciated that the longer time averaged value of the current appears as set forth in FIG. 6.

After the battery voltage is charged to a predetermined level ($V_{blk}$ in FIG. 6), then the current goes to zero, and remains at zero until the voltage falls to $V_{flr}$. At that point, the current again is elevated to $I_{max}$. Thus, it will be appreciated that no "trickle" charge is employed and that only a "constant" current is employed based upon the battery block 59 charge level.

As noted above, the controller means 60 includes a plurality of timers to insure proper charging time limits. For example, a battery which does not properly charge during a specified period will cause the perceptible indicia 61 to light. A more detailed discussion of the controller means is set forth in the application note published by BENCHMARQ Microelectronics, Inc., of Dallas, TX, entitled bq 2031 Lead-Acid Fast Charge IC (1996 Data Book), which application note is hereby incorporated herein by reference and made a part hereof.

Figure 3:
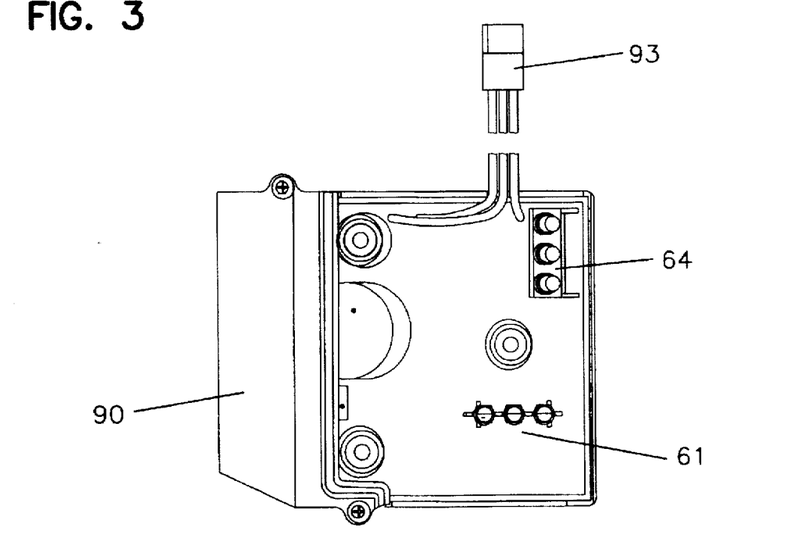
FIG. 3 is a top plan view of a preferred embodiment battery charger device 50 of FIG. 2 located within flame retardant shell 90.
Figure 4A:
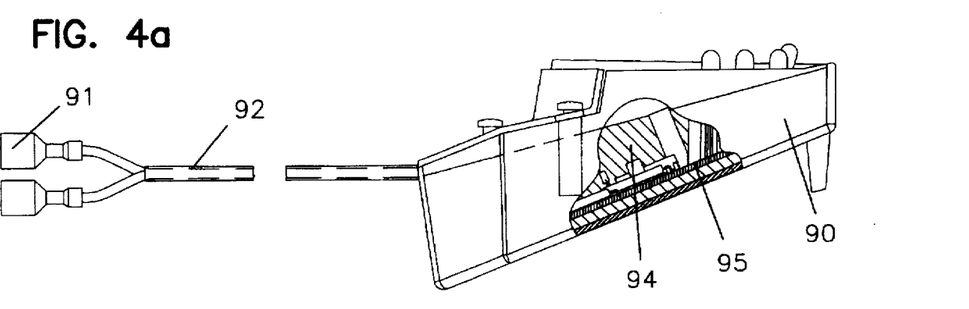
FIG. 4a is a side elevational view of the shell 90 of FIG. 3 (with portions broken away to illustrate a printed circuit board 95 on which various components of charger device 50 are located)
Figure 4B:
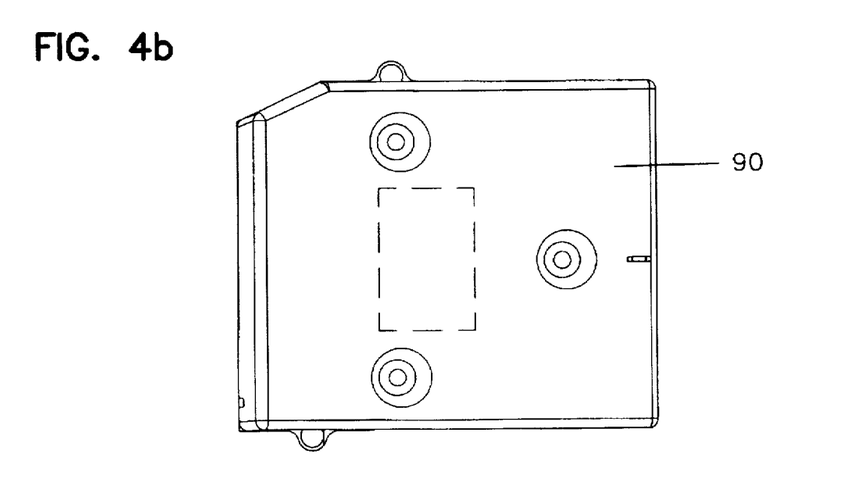
FIG. 4b is a bottom plan view of the shell 90 of FIG. 3.

Turning now to FIGS. 3, 4a, and 4b, there is illustrated a preferred enclosure/shell 90 for the charger device 50, a first connector device 93 (which is connected to the battery), and a second connector device 91 (which is connected to the transformer 51). Second connector device 91 includes an insulating sleeve 92 discussed further below. Potting material is not shown in FIG. 3, but is shown in the cut-away portion of FIG. 4a at the designation 94. The potting compound 94 is utilized in order to minimize contact between ambient conditions encountered in a turf maintenance setting and the electronics of charger device 50. An additional benefit of the potting compound is that it tends to help protect the various components from vibration/fatigue in the electric mower 20 environment in which the present invention is employed. It will be appreciated that the transformer 51 is not located within shell 90 in the preferred embodiment, but is instead located in a second shell 96 (best seen in FIGS. 1a and 1c).

In order to comply with certain requirements of the U.L. agency for shock, the present charger device 50 and the electric mower 20 itself is double insulated. The step down transformer block 51 provides one layer of insulation (e.g., it isolates power from ground) and the body 22 of the electric mower 20 provides the second layer (e.g., the electric mower 20 is insulated).

In order to comply with certain requirements of the U.L. agency for fire, the transformer enclosure 96 and circuit board shell 90 are both preferably constructed of a flame retardant material. In the preferred embodiment, the material is a plastic of the type manufactured by General Electric under the trade name designation NORYL (SE-1 grade for the transformer enclosure and PX-1700 grade for the printed circuit enclosure shell 90). As noted above, sleeve insulation 92 is provided about the electrical conductors between the transformer block 51 and the circuit board 95 (best seen in FIG. 4a) for the charger device 50. Additionally, the output of the charger device 50 is fuse limited below class 2 energy limits (e.g., 100 VA). To avoid making the entire mower flame retardant, the shape of the shell 90 is important to contain all of the electrical devices.

It will be appreciated that the principles of this invention apply not only to the circuit and components used to implement the invention, but also to the method of utilizing a constant current source charger device located on-board a turf maintenance vehicle.

While a particular embodiment of the invention has been described with respect to its application, it will be understood by those skilled in the art that the invention is not limited by such application or embodiment or the particular circuit disclosed and described herein. It will be appreciated by those skilled in the art that other circuit configurations that embody the principles of this invention and other applications therefor other than as described herein can be configured within the spirit and intent of this invention. The circuit configuration described herein is provided as only one example of an embodiment that incorporates and practices the principles of this invention. Other modifications and alterations are well within the knowledge of those skilled in the art and are to be included within the broad scope of the appended claims. For example, while the controller device utilized herein is an analog device, those of skill in the art will appreciate that a digital device might be utilized.

What is claimed is:

1. A self-contained battery charger apparatus for charging a battery for an electrically powered turf mower, the battery having a voltage, comprising:
   a) an AC to DC converter for accepting a source of AC power and providing a DC current source output;
   b) a regulator device operatively connected between said converter for receiving said current source output and the battery, wherein said regulator device is responsive to control signals for selectively providing said current source output to the battery;
   c) first sensor means for measuring the voltage of the battery and providing a first voltage signal;
   d) second sensor means for measuring the current delivered to the battery and providing a second voltage signal; and
   e) controller means, operatively connected to said first and second sensor means and said regulator device, for determining the voltage of the battery from said first voltage signal, for determining the current provided to the battery from said second voltage signal, and for providing a pulse width modulated control signal to said regulator device to provide a periodic constant current level to the battery based on said determined battery voltage and current.

2. The apparatus of claim 1, further comprising first visual indicator means, operatively connected to said controller means, for alerting an operator of normal and abnormal charge conditions of the battery.

3. The apparatus of claim 2, wherein said controller means includes means for storing one or more predetermined values and a plurality of timers for determining the lengths of charge times and comparing said determined lengths of charge times with one or more of said predetermined values, wherein if said determined lengths of charge times exceed said predetermined values, then a first visual indicator is lit.

4. The apparatus of claim 1, further comprising second visual indicator means, operatively connected to the battery, for alerting an operator of the remaining battery charge.

5. The apparatus of claim 1, further comprising a shell for containing said converter, said regulator device, said first and second sensor means, and said controller means on-board the turf mower.

6. The apparatus of claim 5, wherein said converter, said regulator device, said first and second sensor means, and said controller means are potted within said shell, whereby the battery charger is sealed from the environment.

7. The apparatus of claim 6, wherein said regulator device, said first and second sensor means, and said controller means are located within a single shell.

8. The apparatus of claim 6, wherein said regulator device, said first and second sensor means, and said controller means are located within a first shell and wherein said converter means are located within a second shell.

9. The apparatus of claim 1, wherein said controller means generates a pulse width modulated control signal for said regulator means, whereby the battery charger generates a smaller amount of thermal energy than a linear mode charger device, wherein potting and encapsulation is allowed.

10. An on-board battery charger apparatus, for charging a battery for an electrically powered turf mower, comprising:
   a) an electric turf mower, said turf mower including:
      i) a frame;
      ii) a battery, said battery including a voltage;
      iii) a cutting member, rotatably connected to said frame and arranged and configured for cutting turf;
      iv) an electric motor, operatively connected to said frame, said battery, and said cutting member, for rotating said cutting member;
   b) a single shell cooperatively mounted to said turf mower;
   c) an AC to DC converter for accepting a source of AC power and providing a current source output;
   d) a regulator device operatively connected between said converter for receiving said current source output and said battery, wherein said regulator device is responsive to control signals for selectively providing said current source output to said battery;
   e) first sensor means for measuring the voltage of said battery and providing a first voltage signal;
   f) second sensor means for measuring the current delivered to said battery and providing a second voltage signal;
   g) controller means, operatively connected to said first and second sensor means and said regulator device, for determining the voltage of said battery from said first voltage signal, for determining the current provided to said battery from said second voltage signal, and for providing a control signal to said regulator device to provide a periodic constant current level to said battery based on said determined battery voltage and current; and
   h) wherein said controller means, said first and second sensor means, and said regulator means are located and potted entirely within said shell.

11. The apparatus of claim 10, further comprising first visual indicator means, operatively connected to said controller means, for alerting an operator of normal and abnormal charge conditions of said battery.

12. The apparatus of claim 10, wherein said controller means includes a plurality of timers for determining the lengths of charge times and comparing said determined lengths of charge times with values stored in a memory location, wherein if said determined lengths of the charge times exceed said stored values, then a first visual indicator is lit.

13. The apparatus of claim 10, further comprising second visual indicator means, operatively connected to said battery, for alerting an operator of the remaining battery charge.

14. A method of insulating against electrical shock and fire in a self-contained battery charger apparatus for charging a battery for an electrically powered turf mower, wherein the battery charger includes an isolation transformer and electrical components which are connected together with electrical conductors, comprising the steps of:

a) enclosing an isolation, step-down transformer in a first flame retardant enclosure located within the mower, wherein said isolation transformer provides a first insulation layer;

b) enclosing in a second flame retardant enclosure battery charger electronics, said battery charger electronics generating a charging current output with a power;

c) insulating an electrical conductor between said transformer and said battery charger electronics;

d) fusing the power output of said battery charger electronics to the battery below a predetermined level; and e) providing a second insulation layer on the mower, wherein said first and second layers provide double insulation for electrical shock.

15. The method of claim 14, wherein:

a) said first and second enclosures are constructed of plastic;

b) said fuse limits the power output below 100 VA; and c) said second insulation layer on the mower is a plastic shell encompassing the top and sides of the mower.

16. An on-board battery charger apparatus for charging a battery for an electrically powered turf mower, comprising:

a) an electric turf mower, said turf mower including:
 i) a frame;
 ii) a battery, said battery including a voltage;
 iii) a cutting member, rotatably connected to said frame and arranged and configured for cutting turf;
 iv) an electric motor, operatively connected to said frame, said battery, and said cutting member, for rotating said cutting member;

b) a single shell cooperatively mounted to said turf mower;

c) an AC to DC converter for accepting a source of AC power and providing a current source output;

d) a regulator device operatively connected between said converter for receiving said current source output and said battery, wherein said regulator device is responsive to control signals for selectively providing said current source output to said battery;

e) first sensor means for measuring the voltage of said battery and providing a first voltage signal;

f) second sensor means for measuring the current delivered to said battery and providing a second voltage signal;

g) controller means, operatively connected to said first and second sensor means and said regulator device, for determining the voltage of said battery from said first voltage signal, for determining the current provided to said battery from said second voltage signal, and for providing a control signal to said regulator device to provide a periodic constant current level to said battery based on said determined battery voltage and current; and h) wherein said controller means, said first and second sensor means, and said regulator means are located and potted entirely within said shell, whereby the turf mower complies with electrical shock and fire standards of the *UL Standards for Safety*, UL 1447 and UL 1012 in effect as of May 31, 1996.

17. The apparatus of claim 16, further comprising first visual indicator means, operatively connected to said controller means, for alerting an operator of normal and abnormal charge conditions of said battery.

18. The apparatus of claim 16, wherein said controller means includes a plurality of timers for determining the measured lengths of charge times and comparing the measured lengths of charge times with values stored in a memory location, wherein if the measured lengths of charge times exceed the stored values, then a first visual indicator is lit.

19. The apparatus of claim 16, further comprising second visual indicator means, operatively connected to said battery, for alerting an operator of the remaining battery charge.

* * * * *

UNITED STATES PATENT AND TRADEMARK OFFICE
CERTIFICATE OF CORRECTION

PATENT NO. : 5,727,372
DATED : March 17, 1998
INVENTOR(S) : Kanitz et al.

Page 1 of 2

It is certified that error appears in the above-identified patent and that said Letters Patent is hereby corrected as shown below:

Correct Figure 2 as follows:

FIG. 2

UNITED STATES PATENT AND TRADEMARK OFFICE
CERTIFICATE OF CORRECTION

PATENT NO. : 5,727,372
DATED : March 17, 1998
INVENTOR(S) : Kanitz et al.

It is certified that error appears in the above-identified patent and that said Letters Patent is hereby corrected as shown below:

Figure 2: insert numeral --64-- across from "Ra"

Figure 2: next to "LED's" "64" should read --61'--

Column 7:
Line 10 "thermister" should read --thermistor--
Line 15 "LEDs 64" should read --LEDs 61'--.

Signed and Sealed this

Third Day of July, 2001

*Attest:*

*Attesting Officer*

NICHOLAS P. GODICI
*Acting Director of the United States Patent and Trademark Office*